United States Patent
Neander

[15] 3,679,191
[45] July 25, 1972

[54] RUNNING CARRIAGE FOR A COORDINATE GAS CUTTING MACHINE

[72] Inventor: Erich Neander, Weisskirchen, Germany
[73] Assignee: Messer Griesheim GmbH, Frankfurt Main, Germany
[22] Filed: Aug. 28, 1970
[21] Appl. No.: 67,694

[30] Foreign Application Priority Data
Sept. 2, 1969 Germany..................P 19 44 480.5

[52] U.S. Cl..............................266/23 K, 408/234
[51] Int. Cl..................................................B23k 5/22
[58] Field of Search.......................33/1 M; 82/2.4; 143/47 D; 266/23 K, 23 E, 23 M, 23 C, 23 B; 308/3 R, 3 A; 408/234, 237

[56] References Cited
UNITED STATES PATENTS

| | | | |
|---|---|---|---|
| 3,423,081 | 1/1969 | Schwartz | 266/23 E |
| 3,559,971 | 2/1971 | Rogers | 266/23 E |
| 2,477,041 | 7/1949 | Bucknam et al. | 266/23 C |
| 1,225,726 | 5/1917 | Becker | 308/3 A |
| 1,853,026 | 4/1932 | Anderson | 266/23 B |
| 2,104,299 | 1/1938 | Grundstein | 143/47 D |
| 3,442,499 | 5/1969 | Roder | 266/23 K |

FOREIGN PATENTS OR APPLICATIONS 902,570  1/1954  Germany..................266/23 K Primary Examiner—Gerald A. Dost
Attorney—Ernest F. Marmorek

[57] ABSTRACT

A longitudinally running carriage carries a transverse track for supporting and guiding a transverse drive carriage with torch supporting means. The transverse track is detachably fastened to the longitudinal running carriage and is adjustable in vertical and horizontal directions.

5 Claims, 2 Drawing Figures

INVENTOR.
ERICH NEANDER
BY Ernst F. Neumark
HIS ATTORNEY

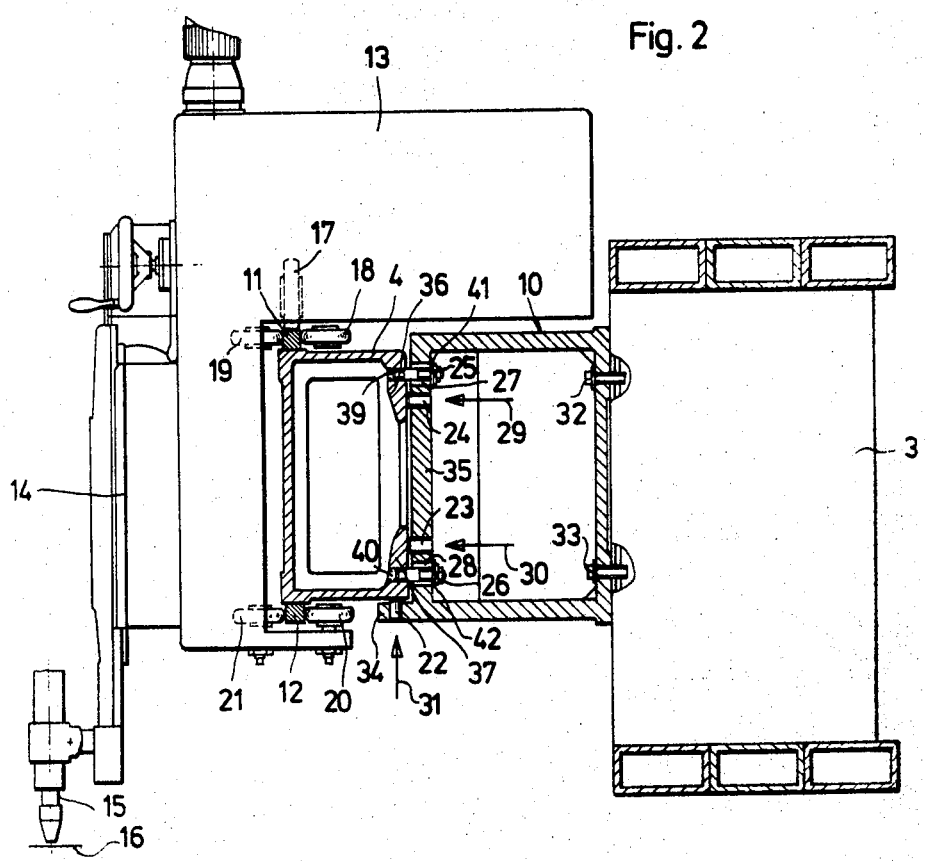

RUNNING CARRIAGE FOR A COORDINATE GAS CUTTING MACHINE

BACKGROUND OF THE INVENTION:

This invention relates generally to the construction of a work machine for a coordinate gas cutting machine and, more particularly, to the adjustable arrangement of the transverse track for the transverse drive carriage.

Coordinate gas cutting machines serve for fully automatic flame cutting from reduced scale drawings or from negatives which are projected onto a ground glass screen with the aid of an optical pattern table. They may also be controlled numerically, in which case punched taps are used as information carrier for the numerical continuous-path control.

A coordinate gas cutting machine of this kind consists essentially of the work machine, the transmitter machine and, depending on the equipment used, the optical pattern table or the electrical control apparatus of the punched tape control system with monitoring drafting machine. The work machine is composed of the longitudinally running carriage which supports a transverse track, the transverse drive carriage on the track, the torch suspensions, and various switch and control elements including switchboards and gas pipes.

The present invention deals with the construction of a running carriage for a coordinate flame cutting machine of this kind, consisting of two wheel boxes which are spaced apart from one another and serve for the longitudinal travel of the machine and which are connected together by cross-beams, the cross-beam or one of the cross-beams carrying the transverse track for guiding the transverse drive carriage or carriages with the torch suspension.

In previously known running carriages of this kind the surfaces for bolting the transverse track on the cross-beam, among other parts, had to be accurately machined in planing machines. This work is extremely expensive and makes it necessary to have suitable machine facilities, since machine widths of 20 meters or more are involved. After machining, the transverse running track was bolted to the front cross-beam. During the transport of these machines, which is the assembled condition are very heavy and bulky, the transverse track could easily be damaged. Such damage could also be caused, for example, when bringing up and removing the workpieces to be cut (large metal sheets), through cranes, and so on. Readjustment of the transverse track could than be effected, if at all, only with great difficulty and with expensive means. This difficulty also existed if deviations from the required dimension occurred during operation, for example through the subsequent fitting of additional heavy torch units and the like.

SUMMARY OF THE INVENTION

An object of this invention, therefore, is to design the coordinate running carriage of the aforementioned kind in such a manner that its transverse track for the transverse running carriage need no longer be accurately machined over its entire bolt connection surface as hitherto.

It is still another object of this invention to enable readjustment of the transverse track in any desired manner and at any time after assembly.

According to this invention, the above objects are attained by detachably fastening the transverse track on the longitudinally running cross beam by bolts passing the fastening holes having increased clearance and by providing adjustment means which make it possible to adjust and readjust within the range of the clearance the vertical and horizontal position of the transverse track prior to its final fastening. Readjustment is thus possible without difficulty at any time, and faultless running of the transverse carriage together with the supported torch suspension is always ensured.

In addition, it is proposed according to the invention to fasten the transverse track on brackets, which in turn are disposed on one of the cross-beams. The brackets can likewise be fastened detachably by means of threaded bolts on the cross-beam. The transverse track itself may for example consist of a tubular piece of rectangular cross-section, on which the guide rails for the transverse carriage are fastened. In a particularly advantageous embodiment of the invention there is provided between the brackets and the tranSverse running path a bolted connection the threaded bolts of which are guided in vertical slots in the bracket faces facing the transverse running track. It is advantageous to provide on the brackets adjusting means which act in the vertical and horizontal directions in relation to the transvers track in such a manner that in conjunction with the bolted connection horizontal and vertical adjustment of the guide rails is possible. Through these simple bolt and adjusting means the transverse track can be readjusted as desired practically at any time without complicated work or additional machining of the guide rails. The transverse track can be raised uniformly or even on one side, shifted horizontally, and in the case of adjustment on the one side may even be swiveled as desired in its plane.

Threaded pins disposed in corresponding threaded bores in the brackets are for example used as adjusting means. The threaded pins serving for adjustment in the horizontal plane are in this case disposed in horizontal threaded bores in the bracket faces facing the transverse track. It is then advantageous for at least two rows of threaded pins, lying opposite one another, to be disposed in the bracket faces facing the transverse track, one row acting against the bottom and the other row acting against the top region of the transverse track.

In further development of the invention it is proposed that the end wall of the bracket should be bent over at the bottom in the direction of the transverse running track and should engage under the latter, the threaded pins for the vertical adjustment of the transverse running track being in that case disposed in the bent-over portion.

BRIEF DESCRIPTION OF SEVERAL VIEWS OF THE DRAWING:

The invention will be explained in greater detail with the aid of a drawing which illustrates a random example of an embodiment and in which:

FIG. 2 is a cross-section through the transverse track along the line A–B of FIG. 1.

Figure 1:
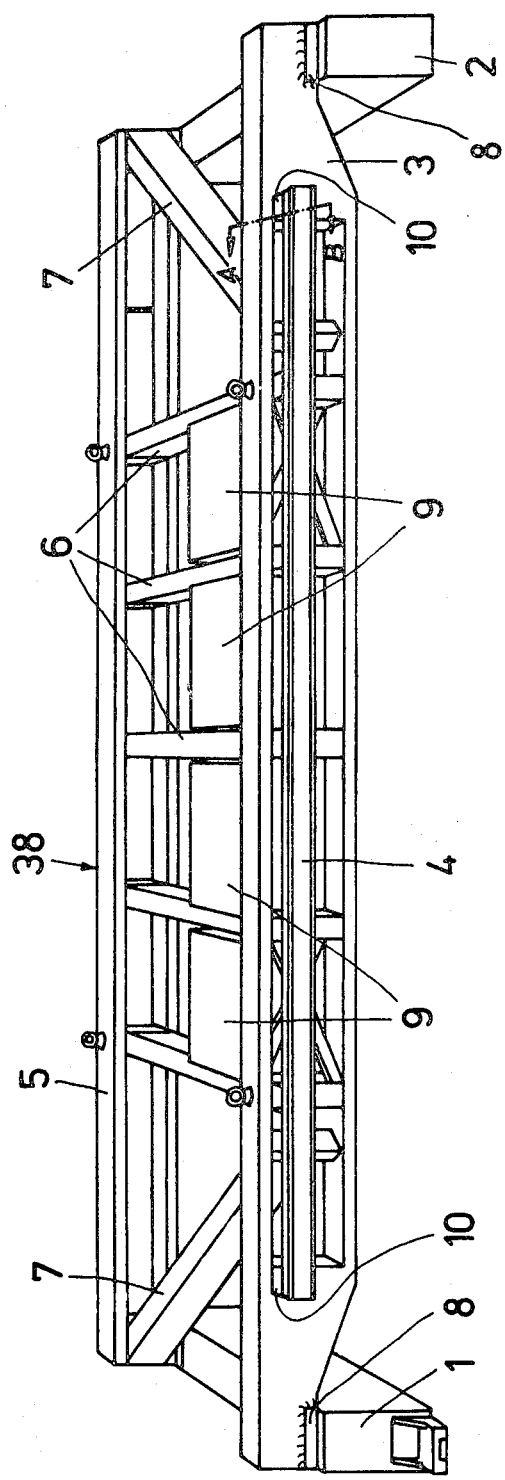
FIG. 1 shows a running carriage constructed in accordance with the invention, in a side view, taken obliquely from above, in perspective.

DETAILED DESCRIPTION:

As can be seen from FIG. 1, the running carriage 38 consists essentially of two wheel boxes 1 and 2, which in the example illustrated are connected by two cross-beams 3 and 5 and travel in a longitudinal direction. Stiffening cross-members 6 and 7 are disposed between the cross-beams 3 and 5; 9 designates boxes which are fastened on the rear wall of the front cross-beam 3 and serve to receive the electrical equipment. They may for example be made of steel, aluminum, plastics, or the like. On the front of the front cross-beam 3 there are disposed brackets 10, on which the transverse track 4 for a transversally running carriage is disposed. Angle-iron elements 8 serve to connect the cross-beams 3 and 4 to the wheel boxes 1 and 2.

The actual construction and fastening of the transverse track 4 will be described more fully with reference to FIG. 2, which shows a section along the line A–B in FIG. 1. The bracket 10 is detachably fastened, for example by means of threaded bolts 32, to the front cross-beam 3. In the front face 35 of the bracket 10 there are provided horizontal slots 27 and 28 having increased clearance and through which the stems of bolts 25 and 26 pass; the threaded ends of the stems of said bolts engage in threaded bores 39 and 40 provided in the rear wall of the transverse track 4. Inside the bracket 10 the bolts 25 and 26 are supported for example by means of washers 41 and 42 which cover the increased diameter of slots 27 and 28. The transverse track 4, which consists of a tubular piece preferably of rectangular cross-section is provided on its upper and lower surfaces with guide rails 11 and 12.

There is a transverse running carriage 13 on which a torch mounting 14 carrying the torch 15 is fastened; said transverse running carriage 13 runs with the aid of supporting rollers 17 on the guide rail 11 and is guided by lateral rollers 18, 19, 20, and 21 on the guide rails 11 and 12.

For the purpose of adjusting the transverse track 4 in relation to the bracket 10 on the front cross-beam 3, threaded pins 22, 23 and 24 are provided in the corresponding threaded slots in the bracket 10. The threaded pins 23 and 24 are disposed in horizontal threaded bores in the front face 35 and the threaded pin 22 is disposed in a vertical threaded bore in a projecting arm 34 at the bottom of the bracket 10. The number of threaded pins and bolts lying one behind the other in a row can be selected as desired in accordance with requirements in each particular case. The threaded pins 23 and 24 are, however, so disposed that one row of threaded pins 23 acts against the bottom region 37 and the other row of threaded pins 24 acts against the top region 36 of the transverse track 4.

Through suitable slackening and tightening of the bolts 25 and 26 in the slots 27 and 28 and of the threaded pins 22, 23 and 24, it is possible to readjust the transverse track 4 in any desired manner in the range determined by the increased diameter of the slots 27 and 28 with respect to the diameter of bolts 25 and 26.

The corresponding directions of adjustment are indicated by arrows 29, 30 and 31, but provision may also be made for swiveling within a determined range, for example by tightening the threaded pin 22 Only at the front end of the transverse running track 4. In the same way it is also possible to achieve transverse swiveling by differently adjusting the two bolts 25 and 26, in conjunction with the action of the threaded pins 23 and 24.

I wish it to be understood that I do not desire to be limited to the exact details of construction shown and described, for obvious modifications will occur to a person skilled in the art.

Having thus described the invention, what I claim as new and desire to be secured by Letters Patent, is as follows.

1. In a running carriage for a coordinate gas cutting machine, having two wheel boxes spaced one from the other and serving for the longitudinal running of the machine, cross-beams connecting said wheel boxes, a transverse track fastened to one of said cross-beams, a transverse running carriage with a torch suspension supported for travel on said transverse track,
   the improvement of
      an arrangement for adjustment of the position of the transverse track with respect to the supporting cross-beam,
   comprising, in combination,
      adjusting means for presetting the position of said transverse track within a predetermined range in horizontal and vertical directions, detachable fastening means having a clearance for permitting the adjustment of said transverse track, within said predetermined range, bracket means disposed on one of said cross-beams and detachably supporting said transverse track,
      said transverse track being fastened to said bracket means by threaded bolts passing through slots in said bracket means, said slots having increased clearance with respect to the diameter of the stems of said threaded bolts in order to permit adjustment of said transverse track in said vertical and horizontal directions, said adjusting means being threaded pins disposed in corresponding threaded bores in said brackets.

2. In a running carriage according to claim 1, said transverse track comprising a tubular piece of rectangular cross-section and guiding rails attached to the bottom and top surfaces of said tubular piece, respectively.

3. In a running carriage according to claim 1, the bottoms of said brackets supporting a projecting arms, and a number of said threaded bores with threaded pins being disposed in a vertical plane in said arms to engage the bottom surface of said transverse track.

4. In a running carriage according to claim 3, said threaded bores with the threaded pins for adjustment in the horizontal plane being disposed horizontally in the face walls of said brackets opposite the mating surface of said transverse track.

5. In a running carriage according to claim 4, said horizontal threaded bores with threaded adjusting pins being arranged in two rows, one of said rows being located at the bottom region and the other row at the top region of said transverse track.

* * * * *